Patented May 29, 1951

2,554,995

UNITED STATES PATENT OFFICE 2,554,995

22-ARYL-BISNOR-4-CHOLENE-22-OL-3-ONES

Robert H. Levin, A. Vern McIntosh, Jr., and George B. Spero, Kalamazoo, Mich., assignors to The Upjohn Company, Kalamazoo, Mich., a corporation of Michigan No Drawing. Application April 25, 1949,
Serial No. 89,566

4 Claims. (Cl. 260—397.4)

This invention relates to novel chemical intermediates, 22-aryl-bisnor-4-cholene-22-ol-3-ones, which are useful in the synthesis of progesterone.

The novel compounds of the present invention have the following formula:

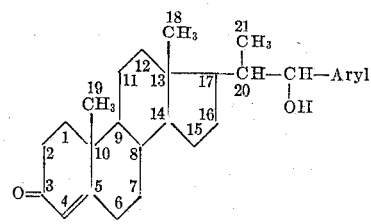

The 22-aryl group of the compounds of this invention may be any aryl group. However, practical considerations concerning the preparation of the 22-aryl compounds, limit the aryl groups to those groups whose halogen substitution derivatives react in a satisfactory manner with magnesium to form an aryl magnesium halide compound. Among the preferred aryl groups which may be substituted on the 22-carbon atom are for example, phenyl, tolyl, alpha-naphthyl, beta-naphthyl, alkoxy-phenyl, chloro-phenyl, alkoxy-naphthyl, alkyl-naphthyl, et cetera.

The novel compounds of the present invention can be easily prepared by the selective oxidation of the 3-hydroxyl group and the simultaneous isomerization of the 5,6-double bond to a 4,5-double bond of a 3,22-dihydroxy-22-aryl-bisnor-5-cholene, using an aluminum alkoxide and a ketone. Alternatively, the novel compounds of the present invention can be prepared by the hydrolysis of a 22-acyloxy-22-aryl-bisnor-4-cholene-3-one, described in our cofiled application, Serial No. 89,568, using an alcoholic alkali metal hydroxide. The compounds thus formed may be converted to progesterone by the dehydration of the 22-hydroxyl group using oxalic acid in the presence of an inert solvent and heat. Thereafter, the double bond formed by the dehydration is oxidized with chromic acid, forming progesterone.

The compounds of the present invention are white crystalline solids soluble in hot alcohol and insoluble in cold alcohol.

The selective oxidation of the 3-hydroxyl group, without the simultaneous oxidation of the hydroxyl group in the 22-position of a steroid molecule is unexpected in view of the opposite result previously obtained, using a homologous compound having a hydroxyl group in the 24-position of a steroid molecule. Levin, Spero, McIntosh and Rayman, J. Am. Chem. Soc., 70, 2953 (1948) have shown the oxidation of a 3,24-dihydroxy-24-aryl-bisnor-5-cholene using aluminum isopropoxide and cyclohexanone under substantially the same conditions. They obtained a 3,24-diketo-24-aryl-bisnor-4-cholene, both hydroxyl groups being oxidized to carbonyl groups. It was similarly anticipated that the oxidation of a 3,22-dihydroxy-24-aryl-bisnor-5-cholene would be productive of a diketone since the diketone was obtained by Butendandt and Fleischer, Ber., 70, 96 (1937) and J. Am. Chem. Soc. 67, 1369 (1945) when the 3,22-diol was oxidized using $CrO_3$. However, only the 3-hydroxyl was oxidized, which is definitely unexpected in view of the teachings of Levin et al., supra.

The following preparations and examples are given to illustrate procedures which may be used to prepare the compounds of the present invention, but they are not to be construed as limiting.

PREPARATION 1.—PREPARATION OF 22-BENZOYLOXY-22-PHENYL-BISNOR-5-CHOLENE-3-OL

A solution of 701.6 milligrams of 3,22-dibenzoyloxy-22-phenyl-bisnor-5-cholene [Heyl, Centolella and Herr, J. Am. Chem. Soc. 69, 1960 (1947)] in 420 milliliters of acetone was mixed with 56 milliliters of 0.10-normal aqueous potassium hydroxide and allowed to stand forty-five hours at 33–34 degrees centigrade. The solution was then acidified by the addition of two milliliters of acetic acid and evaporated in vacuo until precipitation began. One volume of water was added and the mixture cooled. There was thus obtained 597 milligrams of a solid melting at 114–125 degrees centigrade. This solid was dissolved in 25 milliliters of hot benzene, and allowed to stand at room temperature, thereby precipitating 46.6 milligrams of 22-phenyl-bisnor-5-cholene-3,22-diol melting at 222–227 degrees centigrade. The filtrate was passed through a column containing 50.5 grams of Fisher alumina. The first fraction of 71 milligrams was eluted with benzene and consisted of unchanged 3,22-dibenzoyloxy-22-phenyl-bisnor-5-cholene. The second fraction, 495 milligrams, was eluted with benzene containing two percent methanol, dissolved in 25 milliliters of warm benzene and placed in the refrigerator at 6 to 8 degrees centigrade to yield a precipitate of 16.0 milligrams of 22-phenyl-bisnor-5-cholene-3,22-diol having a melting point of 221–224 degrees centigrade. The filtrate was evaporated in vacuo on a steam cone to yield 479 milligrams of crude 22-benzoyloxy-22-phenyl-5-cholene-3-ol as a light yellow foam.

PREPARATION 2.—22-BENZOYLOXY-22-PHENYL-BISNOR-4-CHOLENE-3-ONE

A solution of 479 milligrams of crude 22-benzoyloxy-22-phenyl-bisnor-5-cholene-3-ol in 20 milliliters of toluene and ten milliliters of cyclohexanone was distilled until one milliliter of distillate had been collected. Five-tenths gram of aluminum isopropoxide was then added and the mixture heated under reflux for three hours. The reaction mixture was shaken with ether and 3-normal hydrochloric acid, and the ether solution was washed with 3-normal hydrochloric acid, water, ten percent sodium hydroxide, 3-normal hydrochloric acid, and saturated aqueous sodium chloride. The solution was distilled with steam for an hour, yielding 421 milligrams of a precipitate melting at 85–90 degrees centigrade. The precipitate was chromatographed over Fisher alumina, giving a main fraction of 419 milligrams which, when crystallized from ethanol and water, yielded 332.3 milligrams of crystals, crude 22 - benzoyloxy - 22-phenyl-bisnor-4-cholene-3-one, melting at 158–164 degrees centigrade. After several crystallizations from alcohol-water and two crystallizations from ethanol, the compound melted at 181.5–182.5 degrees centigrade.

$[\alpha]_D^{25}$ −11.6 degrees

Analysis:
Calculated for $C_{35}H_{42}O_3$: C, 82.31 H, 8.29
Found: 82.18 8.13

*Example 1.—3-keto-22-phenyl-bisnor-4-cholene-22-ol*

A solution of 79.3 milligrams (0.00016 mole) of 22-benzoyloxy-22-phenyl-bisnor-4-cholens-3-one in ten milliliters of benzene was mixed with a solution of 1.0 gram of 85 percent potassium hydroxide in 15 milliliters of methanol and heated under reflux for two and one-half hours. The resulting solution was diluted with water and extracted with ether. The ether solution was washed with water, dilute hydrochloric acid and aqueous sodium chloride, dried over anhydrous sodium sulfate, and evaporated in vacuo to yield a crystalline residue. This residue was recrystallized from a mixture of 18 milliliters of methanol and five milliliters of water to yield 46.8 milligrams of crystals melting at 218–221 degrees centigrade. Recrystallization from methanol and water gave 39.7 milligrams of crystals having a melting point of 230–232 degrees centigrade $[\alpha]_D^{25}$+174.2 degrees.

Analysis:
Calculated for $C_{28}H_{38}O_2$: C, 82.71 H, 9.42
Found: 82.65 9.27

PREPARATION 3.—3,22-DIHYDROXY-22-(PARA-CHLOROPHENYL)-BISNOR-5-CHOLENE

A solution of para-chlorophenylmagnesium bromide was prepared from 0.3 gram of magnesium, 3.3 grams of para-bromochlorobenzene and 50 milliliters of anhydrous ether in the usual manner. After the Grignard reagent had been obtained, an additional 75 milliliters of ether was added, the solution heated under reflux and a mixture of 1.0 gram of 3-acetoxy-bisnor-5-cholenaldehyde (J. Am. Chem. Soc. 69, 1960 (1947)) in 35 milliliters of benzene added dropwise over a period of 15 minutes. The reaction mixture was heated under reflux for an additional one hour, and poured into 100 milliliters of ten percent hydrochloric acid and ice. The ether and benzene layer was separated and steam distilled. The solid remaining after the steam distillation was collected and crystallized from acetone, yielding a mixture of epimeric 3,22-dihydroxy-22-(para-chlorophenyl)-bisnor-5-cholenes melting at 205–220 degrees centigrade.

In a like manner, (para-anisyl) magnesium bromide and 3-acetoxy-bisnor-5-chlolenaldehyde were reacted to yield 3,22-dihydroxy-22-(para-anisyl)-bisnor-5-cholene melting at 144–146 degrees centigrade.

*Example 2.—Preparation of 3-keto-22-phenyl-bisnor-4-cholene-22-ol*

(a) From high melting epimer.

To a solution of 55 milligrams of 22-phenyl-bisnor-5-cholene-3,22-diol [Butendandt and Fleischer 70, Ber. 96 (1937); Cole and Julian, 67, J. Am. Chem. Soc. 1369 (1945); Heyl, Centolella and Herr, 69, J. Am. Chem. Soc., 1957 (1947)] (high melting epimer obtained by fractional crystallization of the diacetates from butanol followed by saponification) and three milliliters of cyclohexanone in 10 milliliters of toluene was added 0.12 gram of aluminum isopropoxide and the mixture heated under reflux for two hours. The reaction mixture was poured into 15 milliliters of 10 percent hydrochloric acid, the acid extracted with ether, the ether layer separated, washed with water containing sodium bicarbonate and steam distilled. The residual solid was collected and crystallized from acetone. There was thus obtained 50 milligrams of 22-phenyl-bisnor-4-cholene-3-keto-22-ol melting at 217–228 degrees centigrade. Further recrystallization from acetone yielded a product melting at 230–232 degrees centigrade.

(b) From low melting epimer.

The low melting epimer of 22-phenyl-bisnor-5-cholene-3,22-diol when oxidized in the same manner as in (a) yielded an isomer of the 3-keto compound melting at 234–237 degrees centigrade, $[\alpha]_D^{25}$+86 degrees.

Analysis:
Calculated for $C_{28}H_{38}O_2$: C, 82.71 H, 9.42
Found: 82.60 9.63

*Example 3*

In a manner similar to that described in Example 2, 3,22-dihydroxy-22-(para-chlorophenyl)-bisnor-5-cholene is converted to 3-keto-22-hydroxy-22-(para-chlorophenyl)-bisnor-4- cholene, melting at 260.5–262.5 degrees centigrade, and 3,22-dihydroxy-22-(para-anisyl)-bisnor-5 - cholene is converted to 3-keto-22-hydroxy-(para-anisyl)-bisnor-4-cholene melting at 178–184 degrees centigrade.

In a similar manner, the 22-(alpha-naphthyl), 22-tolyl, 22-(alkoxy-naphthyl) and other 22-aryl-bisnor-4-cholene-22-ol-3-ones may be prepared.

It is to be understood that the invention is not limited to the exact details or compounds shown and described, as obvious modificaions and substitutions of equivalents may be made in the present invention without departing from the spirit or scope thereof which will be apparent to one skilled in the art, and we therefore limit ourselves only as defined in the appended claims.

We claim:

1. A 22 - mono-aryl-bisnor-4-cholene-22-ol-3-one, wherein the aryl group is selected from the group consisting of monocyclic aryl, chloro-substituted monocyclic aryl, and lower-alkoxy-substituted monocyclic aryl.

2. 22-phenyl-bisnor-4-cholene-22-ol-3-one.
3. 22-(para-chlorophenyl)-bisnor-4-cholene-22-ol-3-one.
4. 22-(para-anisyl)-bisnor-4-cholene-22-ol-3-one.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,394,551 | Julian et al. | Feb. 12, 1946 |